United States Patent
Brown et al.

[15] 3,639,822
[45] Feb. 1, 1972

[54] SOLID STATE POWER CONTROLLER FOR DC PERMANENT MAGNET AND SHUNT FIELD WINDING MOTORS SUPPLIED FROM AN AC SOURCE

[72] Inventors: Harry W. Brown; Walter L. Rutchik; Lawrence J. Ryczek, all of Milwaukee, Wis.

[73] Assignee: Cutler-Hammer, Inc., Milwaukee, Wis.

[22] Filed: May 11, 1970

[21] Appl. No.: 36,124

[52] U.S. Cl. ............................................. 318/345, 323/36
[51] Int. Cl. ........................................ H02p 5/36, H02p 7/58
[58] Field of Search .............. 318/345, 331; 323/22 SC, 24, 323/25, 22, 36

[56] References Cited

UNITED STATES PATENTS 3,374,421  3/1968  Ringelman ........................... 323/25 X
3,447,057  5/1969  Brown et al. ......................... 323/22 SC X

FOREIGN PATENTS OR APPLICATIONS 1,162,869  8/1969  Great Britain ........................ 318/345

*Primary Examiner*—T. E. Lynch
*Assistant Examiner*—Robert J. Hickey
*Attorney*—Hugh R. Rather

[57] ABSTRACT

A solid state switching circuit and power controller for permanent magnet and shunt field winding motors used in portable power tools and the like. The power controller employs a bidirectional thyristor triode and trigger diode for varying the current supplied to the motor armature, and a full-wave rectifier bridge to establish unidirectional current flow through the motor armature on opposite half cycles of the AC power supply. A resistor across the AC terminals of the rectifier bridge enhances control action under light loads.

1 Claims, 4 Drawing Figures

PATENTED FEB 1 1972

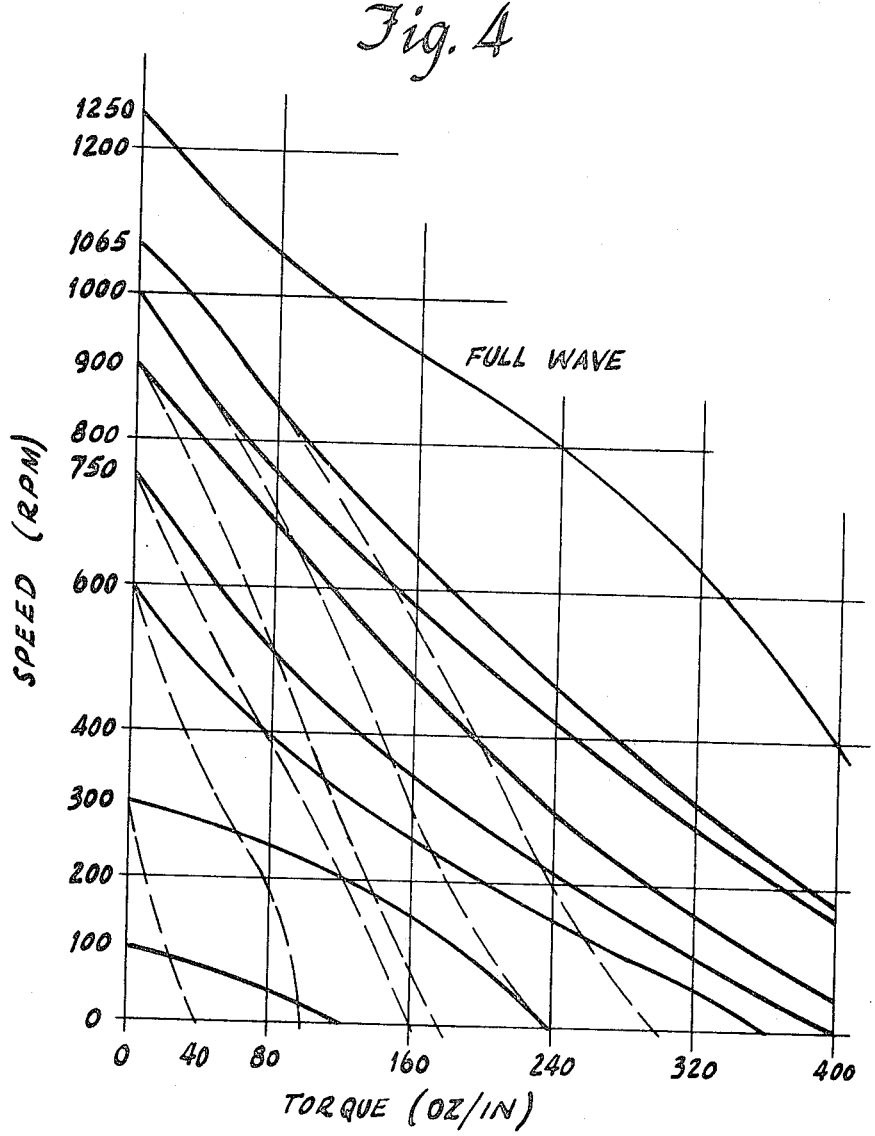

SOLID STATE POWER CONTROLLER FOR DC PERMANENT MAGNET AND SHUNT FIELD WINDING MOTORS SUPPLIED FROM AN AC SOURCE

BACKGROUND OF THE INVENTION

In recent years, permanent magnet motors have developed in power ratings to the point where they are usable for powering portable hand tools and the like. The use of permanent magnet (PM) motors in such application is advantageous because of their smaller size and weight. Heretofore, PM motors used in portable tools have only been available with ON-OFF type of control.

It is a primary object of this invention to provide a solid state switching circuit and controller for permanent magnet and shunt field winding type DC motors which enable their use with commonly available AC voltage sources.

Another object of the invention is to provide a switching circuit and power controller of the aforementioned type which affords variation in controlled motor speed throughout a wide range.

A further object is to provide a controller of the aforementioned type which can be mounted in the standard size housing of a common form of on-off trigger switch.

Other objects and advantages of the invention will hereinafter appear.

BRIEF DESCRIPTION OF THE DRAWING FIGURES

FIG. 4 is a graph depicting certain operating characteristics of the controller.

DESCRIPTION OF THE PREFERRED EMBODIMENT

Figure 1:
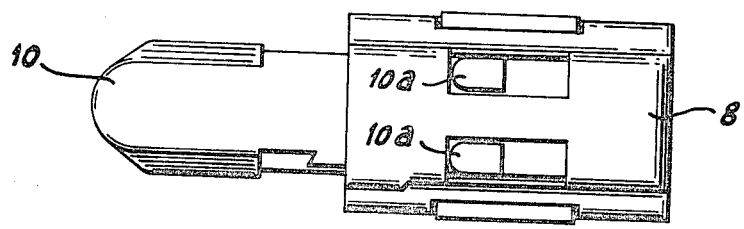
FIG. 1 is a top plan view of a trigger power controller constructed in accordance with the invention.
Figure 2:
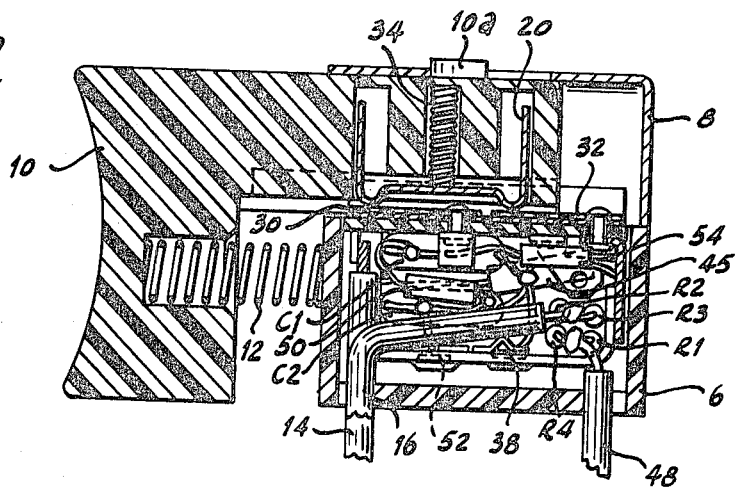
FIG. 2 is an elevational view in longitudinal cross section of the controller.

Referring to FIGS. 1 and 2, there is shown a trigger operated speed control switch which is similar in most external appearance aspects to a trigger operated on-off switch disclosed in the Larkin U.S. Pat. No. 2,988,724. The speed control switch of the present invention comprises an insulating base 6, a switch frame 8 for securing a linearly slidable trigger 10 to the base, and a helical compression spring 12 between the trigger and base for biasing the trigger outwardly from the base. Conductors 14, 16 and 48 extend outwardly from the base for connection to alternating current source terminals L1 and L2 respectively.

Figure 3:
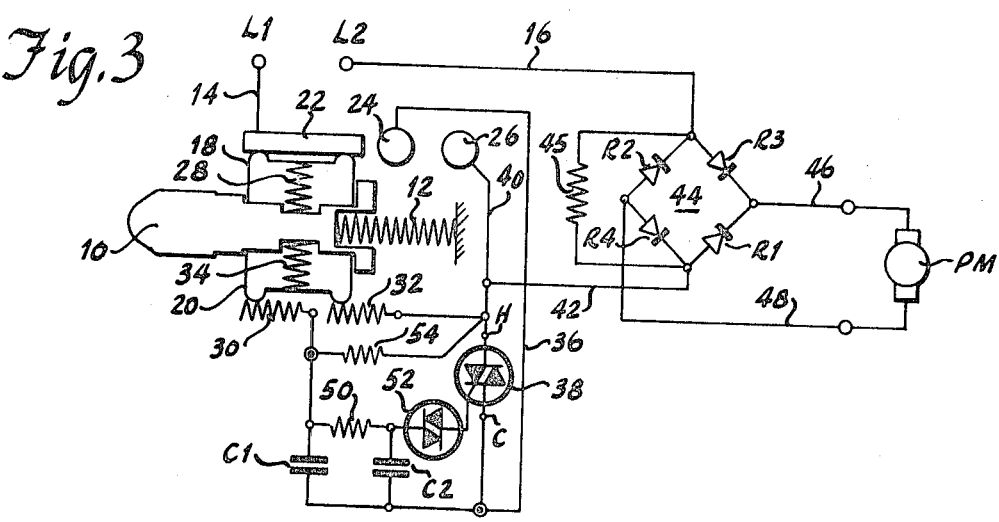
FIG. 3 is a partially schematic and partially diagrammatic illustration of the power controller circuit.

As shown in the system diagram in FIG. 3 the trigger 10 is slidable to the right against the bias of spring 12 to actuate two movable bridging contactors 18 and 20. Contactor 18 is pressed against stationary contacts 22, 24 and 26 by a helical compression spring 28. Contactor 20 is pressed against the resistor strips 30 and 32 by a helical compression spring 34. Contact 22 is elongated while contact 24 is an intermediate contact and contact 26 is a shunting contact. All three of the stationary contacts are preferably arranged in a straight line as shown. Reference should be made to the Brown et al. U.S. Pat. No. 3,447,057 for details of a preferred mechanical arrangement of contactor 18, contacts 22, 24 and 26 and spring 28.

Contact 22 is connected to AC terminal L1 by conductor 14. Contact 24 is connected through a conductor 26 to common electrode C of a bilateral thyristor triode 38 of the type marketed under the trade names "Triac" or "Quadrac." Contact 26 is connected to the "high" electrode H of triac 38 through a conductor 40, and through conductor 40 and a conductor 42 to the lower AC input terminal of a full wave rectifier bridge 44. AC line terminal L2 is connected through conductor 16 to the upper AC input terminal of rectifier bridge 44. The right- and left-hand terminals of bridge 44 are connected by conductors 46 and 48 to the armature of a permanent magnet motor PM. A resistor 45 is connected between the upper and lower AC input terminals of the bridge 44.

Resistor strip 30 is connected at its right hand end to the common point between a capacitor C1 and one end a resistor 50. Resistor 50 is connected at its other end in series with a trigger diode 52, of the type sold under the trade name "Diac," to the trigger electrode T of triac 38. Resistor strip 32 is connected at its right hand end of a trimmer resistor 54. Resistor 54 is connected at its left-hand end to the point common between resistor 30 and 50 and capacitor C1. A second capacitor C2 is connected to the point common between resistor 50 and diac 52, and is connected together with capacitor C1 to the terminal C of Triac 38.

When trigger 10 is pressed a first amount, contactor 18 bridges contacts 22 and 24 thereby connecting line terminal L1 through conductor 36, Triac 38, conductor 42, half-wave rectifier R1, conductor 46, motor PM, conductor 48, half-wave rectifier R2 and conductor 16 to AC line terminal L2. On alternate half-cycles, current will flow from line terminal L2 through conductor 16, half-wave rectifier R3, conductor 46, motor PM, conductor 48, half-wave rectifier R4, conductor 42, Triac 38, conductor 36, contact 24, contact 22 and conductor 14 to line terminal L1. When trigger 10 is pressed further until contactor 18 engages contact 26, it will be observed that Triac 38 is effectively shunted out of the last described circuit. Trigger depression in the range between the aforementioned first amount and that affording bridging of contacts 22 and 26 by contactor 18 affords control of the speed of motor PM from slow to high speed with intermediate speed values being afforded between such ranges of trigger depression.

When contactor 18 bridges contacts 22 and 24 and line terminal L2 is positive with respect to line terminal L1, current flow through rectifier R3, motor PM, rectifier R4, conductor 42, a parallel circuit including resistors 30 and 32 and contactor 20 in one branch and resistor 54 in another branch, a parallel circuit including resistor C2 in the other, conductor 36, contacts 22 and 24 and contactor 18 to line terminal L1. At the same time, positive voltage to terminal H of Triac 38. The control circuit charges capacitor C1 and C2 at a timed rate depending upon the capacitance values of such capacitors and the amount of resistance of resistors 30 and 32 effectively included in their circuits. On the alternate half-cycle of AC supply voltage when terminal L1 is positive with respect to terminal L2, current flows in the reverse direction through capacitors C1 and C2.

When the charge voltage on capacitor C2 reaches a predetermined value equal to the breakover voltage of Diac 52, the latter is rendered conducting in either direction dependent on the polarity of the charge voltage and will discharge capacitor C2 in the trigger and common electrode circuits of Triac 38. The pulse of capacitor discharge current fires Triac 38 into conduction and the latter remains conducting for substantially all of the remainder of the half-cycle of supply voltage. Triac 38 will stop conducting when the current through its terminals H and C decreases to zero at the end of each half-cycle or so near zero that it can no longer sustain conduction. As trigger 10 is depressed more to the right in FIG. 3, it will be apparent that less resistance is included in circuit with capacitors C1 and C2, and consequently the latter charge faster on each half-cycle of supply voltage.

The effect of the R/C network comprising capacitors C1, C2 and resistor 50 is to reduce control hysteresis to a minimum. If at a low speed setting of the trigger diac 52 fires on any given half-cycle, it will discharge capacitor C2 to approximately 2/3 of its original instantaneous voltage. Capacitor C1 in combination with resistor 50 helps to recover some of this voltage loss before commencement of the opposite half-wave of AC voltage. Thus, the phase displacement of the voltage across capacitor C2 is essentially independent of the time of the firing of diac 52 which results in very low hysteresis.

Trimmer resistor 54 is provided to compensate for mechanical variations in tooling tolerances, and in electrical variations such as tolerances in component electrical values.

Preferably this trimmer resistor will have a high resistance value in the neighborhood of one megohm, or less, depending upon test results. Each control unit is initially tested without the trimmer resistor connected in circuit, and the proper value of resistance selected through which will insure full range of speed variations as trigger 10 is depressed through its speed varying range of movement.

It will be apparent that the circuit inclusive of triac 38, diac 52 and the aforedescribed firing contact circuitry is exactly the same as that disclosed in the Brown et al. U.S. Pat. No. 3,447,057 to which reference should be made as to its advantages. As is fully explained in that patent, the use of the two capacitors C1 and C2 in the configuration shown minimizes hysteresis effects that might occur when initially starting cyclic conduction.

While the use of the resistor 45 connected across the AC input terminal of rectifier bridge 44 is not mandatory, it has been found to improve the system response under no load and light load conditions. Because of the counter e.m.f. developed by the motor, rectifiers R1, R2, R3 and R4 become reverse biased through a considerable portion of each AC cycle. This results in the control circuit being decoupled (effectively disconnected) from the AC line source. The resistor 45 provides a current bypass path which presents complete decoupling of the control from the AC line, thereby markedly reducing the tendency of the motor to hunting action under light load and no load conditions. In one preferred embodiment, a resistor value of 39 kΩK. ohms for resistor 45 was found to be particularly satisfactory. However, it will be appreciated that the optimum value for the resistance of resistor 45 will depend upon the particular characteristic of the motor PM and the Triac 38 inclusive of its aforementioned firing control circuit.

As shown in FIG. 2, all of the circuitry aforedescribed in conjunction with FIG. 3 is fitted into the switch base 6 in a manner very similar to that disclosed in the Brown et al. U.S. Pat. No. 3,447,057. The base 6 has two openings in the bottom wall, one at the left hand side through which extend conductors 14 and 16 and another at the right hand side through which conductors 46 (not shown) and 48 extend. Triac 38 and diac 52 are mounted on a metallic heat sink member 60 in the manner described in the aforementioned Brown et al. patent. All other components of the circuit are housed and interconnected within the base 6 as shown in FIG. 3.

Trigger 10 has two upstanding projections 10a which move in elongated rectangular apertures 8a in the top of frame 8. Such projections in operation with the apertures limit the inward and outward travel of trigger 10 with respect to the frame 8 and base 6. Return spring 12 adjacent one end seats in a recess in the handle of trigger 10 and seats at its opposite end in a shallow annular recess formed in the outer surface of the left-hand end wall of the base 8.

FIG. 4 is a graph of speed-torque characteristics. The curves depicted in full lines were those obtained under calibrated speed and load conditions on a hand drill powered by a permanent magnet DC motor which was controlled by the preferred speed controller herebefore described. Curves depicted on broken lines were those obtained under the same load conditions on the same drill with the motor under the control of a commercially available speed controller of the so-called half-wave type which utilizes a phase controlled silicon controlled rectifier (SCR) as the variable current device.

The controller of the present invention provides superior speed-torque characteristics under all conditions, which are particularly pronounced under light load, low speed conditions. It will be noted that in the circuitry of the present invention the motor armature is effectively connected in series with triac 38 and its firing control circuit. Thus the resultant firing phase angle of triac 38 relative to the AC supply voltage will be a function of the feedback effect of the motor armature counter e.m.f. If resistor 45 is not used, somewhat greater feedback effect will result, but the aforedescribed beneficial effect of resistor 45 under light loads outweighs the slight degradation of feedback effect which its use entails.

It will be appreciated that the controller of the present invention can also be used with DC motors having shunt field windings if separate and constant DC excitation of the shunt field windings is provided.

We claim:

1. In a controller for connecting the armature of a DC permanent magnet or shunt-type motor to a source of alternating voltage supply and varying the current supplied thereto, in combination:
    an actuating lever,
    switch means responsive to a given amount of initial movement of said actuating lever to connect the controller to a source of alternating voltage supply,
    current control means including a controllable bidirectional semiconductor device and a control network responsive to additional movement of said actuating lever to control the flow of current through said semiconductor device during opposite half-cycles of connected alternating voltage supply in accordance with the amount of additional movement of said actuating lever,
    a full wave rectifier bridge connected in circuit with said semiconductor device and with the armature of a permanent magnet motor to insure current flow through such armature always in the same direction during opposite half-cycles of the alternating voltage supply,
    and a resistor connected across the AC input terminals of said rectifier bridge.

* * * * *

PO-1050
(5/69)

UNITED STATES PATENT OFFICE
CERTIFICATE OF CORRECTION

Patent No. 3,639,822          Dated March 21, 1972

Inventor(s) Harry W. Brown, Walter L. Rutchik, Lawrence J. Ryczek

It is certified that error appears in the above-identified patent and that said Letters Patent are hereby corrected as shown below:

Column 1, line 64 reads:    "conductor 26" and should read:
--conductor 36--

Column 2, line 6 reads:    "end of" and should read:
--end to the point common between terminal H of Triac 38 and the right hand end of--

Column 2, line 36 reads:    "resistor C2" and should read:
--resistor 50 and capacitor C2 in one branch and capacitor C2--

Column 3, line 24 reads:    "presents" and should read:
--prevents--

Column 3, line 28 reads:    "39 kΩK." and should read:
--39K--

Column 3, line 32 reads:    "aforementioned" and should read:
--aforedescribed--

Signed and sealed this 4th day of July 1972.

(SEAL)
Attest:

EDWARD M. FLETCHER, JR.
Attesting Officer

ROBERT GOTTSCHALK
Commissioner of Patents